UNITED STATES PATENT OFFICE.

IVAR AXEL FERDINAND BANG AND MARIE CHARLES ALFRED RUFFIN, OF PARIS, FRANCE.

MANUFACTURE OF ANHYDROUS STANNIC ACID.

SPECIFICATION forming part of Letters Patent No. 529,100, dated November 13, 1894.

Application filed July 12, 1894. Serial No. 517,331. (No specimens.)

*To all whom it may concern:*

Be it known that we, IVAR AXEL FERDINAND BANG, a subject of the King of Denmark, and MARIE CHARLES ALFRED RUFFIN, a citizen of the Republic of France, both residing at Paris, in the said Republic, have invented a new and useful Improvement in the Manufacture of Anhydrous Stannic Acid, of which the following is a specification.

Stannate of soda in solution, notably that which is obtained as the secondary product in certain processes of recovering tin from waste tin plate, gives by precipitation with carbonic acid a very dense metastannic acid which may be, it is true, dehydrated by desiccation but which always takes up again at the end of a less or greater time the water of hydration which deprives it of the qualities desirable for the manufacture of stanniferous enamel. Besides it possesses a great density which causes it, to employ a workshop term, to "cover badly."

A good stannic acid for the preparation of stanniferous enamel should be absolutely anhydrous and not capable of taking up a trace of water (as combined water) and should have a density as low as possible.

Our invention relates to a process of manufacturing anhydrous stannic acid from alkaline stannates which enables us to obtain a product possessing the desirable qualities hereinabove indicated. Our process consists essentially in replacing the carbonic acid by a solution of a soluble bicarbonate to obtain the precipitate of metastannic acid, and then dehydrating this acid by calcining it at a red-white heat with a small proportion of sulfuric acid. By replacing the carbonic acid by a bicarbonate, instead of obtaining a very dense metastannic acid we obtain on the contrary a metastannic acid which is very light and consequently suitable for the fabrication of an anhydrous stannic acid or light stannic anhydride. On the other hand, in performing the dehydration of this metastannic acid in the presence of sulfuric acid we obtain a product absolutely anhydrous and having no tendency to retake the water of hydration.

The anhydrous stannic acid manufactured by conducting the operations as hereinabove described during the two phases of its preparation fulfills all the desired conditions for obtaining a good stanniferous enamel.

In practice we operate as follows: We treat the solution of stannate of soda by a solution of bicarbonate of soda of about a temperature of 80° centigrade. There is thus formed a precipitate of metastannic acid of low density and great volume. We then separate the precipitate from the liquor by filtration and thus obtain a paste with which we mix intimately a quantity of sulfuric acid corresponding to about five per cent. of the weight of metastannic acid in the dry state. The sulfuric acid employed should have added to it a quantity of water sufficient for the mixture to be in the state of soft paste. We then slowly and completely dry this paste at a temperature as low as it is possible to do it practically (about 50° to 60° centigrade). When the drying is complete we reduce the mixture to powder and charge the powder upon plates and submit it to a high temperature (red-white) in such manner as to obtain the complete dehydration, so that the sulfuric acid is expelled to the last trace.

What we claim as our invention is—

1. A process of making metastannic acid which consists in adding a solution of an alkaline bicarbonate to a solution of an alkaline stannate to precipitate metastannic acid, substantially as herein described.

2. A process of preparation of anhydrous stannic acid which consists in calcining metastannic acid at a red-white heat in the presence of sulfuric acid essentially as hereinabove described.

In witness whereof we have hereunto set our hands in the presence of two subscribing witnesses.

IVAR AXEL FERDINAND BANG.
MARIE CHARLES ALFRED RUFFIN.

Witnesses:
ALCIDE FABE,
EDWARD P. MACLEAN.